Patented June 20, 1950

2,512,375

UNITED STATES PATENT OFFICE 2,512,375

FISH PROTEIN AND MINERAL PRODUCT

Ivan A. Parfentjev, Nanuet, N. Y.

No Drawing. Application May 27, 1946,
Serial No. 672,697

12 Claims. (Cl. 99—14)

This invention relates to the treatment of fish waste and the production therefrom of valuable protein, mineral, amino acid and oil products containing vitamins.

More particularly, the invention relates to improvements in the treatment of fish carcass waste containing fish bones, fish flesh, fish entrails, fish heads, etc., such as fish carcass waste remaining after the cutting of fillets therefrom, whole fish, etc., by an acid treatment for the production of valuable protein, mineral, oil and amino acid products containing valuable vitamins.

A large amount of fish waste is available in the form of carcasses from which fillets have been cut off. In this material the fish flesh is considerably reduced and bone material is increased in proportion.

At the present time fish carcass waste is commonly reduced in rendering plants for the most part to produce relatively low grade fish meal and only a small fraction of it is converted into a better quality product, so-called stick water. Fish meal so produced represents cooked, ground and dried fish carcasses from which fillets have been removed, referred to as gurry, or whole inedible fish, for example manhaden. It contains a high percentage of indigestible fish bones and fiber. Due to the methods of manufacturing such fish meal with the application of high temperature and alkaline reaction and prolonged handling, the vitamin content of the fish proteins and oils is impaired. The amino acids, valuable for alimentation, are largely destroyed and unstabilized oils and lipoids easily become rancid. The stick water represents press water, pressed from the fish offal after cooking, and concentrated to about 50% solids. As fish offal is commonly cooked in a relatively large volume of water, the concentration of the press water is a tedious and expensive procedure.

In contrast with such methods of treating fish carcass waste the improved process of the present invention involves a rapid and relatively inexpensive procedure that can be applied to handling large amounts of fish waste and which yields valuable fish proteins, vitamins, minerals, amino acids, stable oils and lipoids.

The improved process of the present invention will be illustrated by the following more detailed description of examples thereof but it will be understood that the invention is not limited thereto.

As an example of the application of the process of the invention, red fish waste in the form of whole fish from which the fillets have been cut off is ground in a grinder to particles of relatively small size and if the ground material is not sufficiently liquid to permit stirring, a small amount of water is added, usually less than the volume of the ground fish waste.

To the ground fish waste is added a mineral acid, advantageously hydrochloric acid, sufficient in amount to dissolve the fish bones and to convert the fish proteins into a more or less colloidal state. With hydrochloric acid, the amount may be e. g. around 8%–10% of concentrated hydrochloric acid calculated on the weight of the ground red fish waste, the amount varying somewhat with the character of the fish waste. I have found it advantageous to add hydrochloric acid sufficient to give a pH of around 1.6, more or less. After adding the acid, the material is well stirred to insure that the acid is uniformly mixed with the ground material. The acid treatment of the fish waste is promoted by raising the temperature to around 100° C. by the introduction of live steam or by other means of heating and with continued agitation, and this temperature is maintained for a short time until the acid treatment has taken place. The time required may be less than an hour or may, in some cases, be somewhat more. The treatment is continued until the mixture becomes well homogenized and no parts or pieces of fish bodies are left.

This acid treatment step of the process is carried out without the addition of pepsin which would digest and render soluble a large proportion of the fish protein. Such small amounts of proteolytic enzymes as may be present in the fish tissue and entrails have only a limited action in the acid solution, enough to disintegrate the cells, but leaving around e. g. 75% of the protein undigested.

The acid treatment brings about a profound change in the fish bones, converting them into the form of soluble compounds which are present in solution in the treated product. These soluble salts produced by the acid treatment of the bones can, however, readily be precipitated by reducing the acidity of the treated product and thereby obtained as valuable minerals.

At the end of the acid treatment the fish proteins are largely present as finely divided protein in suspension and are advantageously separated from the resulting mixture, e. g., by filtration or by centrifuging in suitable types of centrifugal separators for separating such suspended material. The proteins so separated are undigested proteins in the sense that they have not been substantially hydrolyzed and made soluble as they would be by digestion with pepsin but they are proteins modified by the acid treatment and are in a valuable form for use, e. g., as chicken feed. The protein portion of the acid treated fish waste is separated in the form of a cake and can readily be dried and ground to make a valuable protein meal.

The filtrate or liquid remaining after the separation of the proteins contains the fish oil and this oil can be separated from the aqueous liquid by centrifuging. The separation of the oil can in some cases be promoted by concentrating the filtrate by evaporation or other means so that the oil will more readily separate from it. This oil contains the oil from all parts of the fish, including the liver and entrails, and, while lower in vitamin content than oil separately recovered from the livers or entrails, nevertheless contains important quantities of vitamins.

The aqueous liquid remaining after the removal of the oil still contains most of the fish bones in solution in the form of salts soluble in the acid liquid. This aqueous liquid is treated to reduce its acidity by the addition of alkali such as sodium hydroxide or calcium hydroxide until the acidity has been reduced to about pH 5.2–5.6. The amount of alkali required may vary somewhat but around 1% to 2% of sodium hydroxide, as calculated on the original weight of the fish waste, or gurry, is usually required. At the above pH range the minerals are precipitated as salts and can be separated by filtration, centrifuging or other ways. The mineral precipitate so formed contains some protein material precipitated with the mineral salts but it contains a large proportion of mineral salts in a finely divided state and in a form readily soluble in dilute acid. When dried, this mineral product is a valuable product of the process.

The filtrate or liquid remaining after the separation of the mineral salts is a valuable solution of soluble nitrogen compounds including amino acids and can be used as such or concentrated and used in a concentrated state or evaporated to dryness to give a dried product.

In the series of steps described above the protein is largely recovered as a protein product relatively low in mineral content and a mineral product is obtained as a separate product high in mineral content intimately admixed with protein material. In some cases it is desirable and advantageous to obtain a combined protein and mineral product and this is readily accomplished by reducing the acidity of the acid treated product, before the separation of suspended proteins therefrom, to a pH of about 5.2–5.6. This results in precipitation of the mineral salts so that when the product is then subject to filtering or centrifuging the precipitated minerals and suspended proteins are obtained as a part of a composite protein mineral product. The filtrate or aqueous liquid and oil remaining from the separation of this protein mineral product can then be treated for the separation of oil and to give an aqueous solution of soluble nitrogen compounds including amino acids.

From the treatment of red fish waste in the form of carcasses from which the fillets have been removed, there has been recovered around 15% of dry fish protein and about 5% of the dry mineral fraction containing largely bone minerals and some protein, and with these two fractions representing around 75% of the original nitrogen content of the fish waste treated, the remaining 25% of the nitrogen being recovered in the form of valuable soluble nitrogen compounds including amino acids.

The improved process of the present invention is a relatively simple and inexpensive process and requires little equipment. The acid treatment can readily be carried out in wooden barrels or tanks with direct heating by live steam. The apparatus used for filtering or centrifuging the material to separate the protein should be of acid resisting material. It is one advantage of the process that it is odorless and the amount of acid used is harmless for the described products and gives improved products. In particular, it gives oils which are stable and resistant to rancidity.

The protein product recovered as a special fraction from the acid treated fish waste is a very different product from the ordinary fish meal. While regular fish meal has a considerable portion of indigestible bone and fiber material, the new protein product consists chiefly of proteins derived from fish muscles and viscera. It contains, e. g., around 10% of its nitrogen in the form of amino nitrogen of high nutritional value and it contains a high level of vitamin B complex. It contains free proteolytic and other enzymes. It has an acid reaction and is stable during storage and is free from rancidity. The nature and composition of the protein product are illustrated by the following analyses of different samples prepared from red fish carcass waste:

Sample A

| | Per cent |
|---|---|
| Total nitrogen | 9.786 |
| Amino nitrogen | 0.917 |
| Solids | 84.77 |

Sample B

| | Per cent |
|---|---|
| Solids | 95.74 |
| Ash | 8.19 |

Sample C.—Vitamin B content per 1 gram of dry material

| | Micrograms |
|---|---|
| Riboflavin | 21.77 |
| Niacin | 14.83 |
| Pantothenate | 10.40 |
| Follic acid | 6.83 |

Sample D.—Vitamin B content per 1 gram of dry material

| | Micrograms |
|---|---|
| Thiamin | 15.8 |
| Riboflavin | 22.1 |
| Nicotinic acid | 98.0 |
| Pyridoxin | 8.7 |
| Inositol | 5.4 |

These samples were tested for rancidity by the Kreis test with negative results indicating the absence of any material degree of rancidity.

The mineral product produced by the present process is quite different from bone meal made by grinding fish bones. By the present process most of the minerals are recovered in a special fraction that also contains some proteins similar to those illustrated by the above analysis. The minerals are, moreover, recovered by the present process in the form of salts extraction and soluble in acid and precipitated during the process by a partial reduction of acidity with addition of alkali. This mineral product also contains vitamin B complex and active proteolytic and other enzymes and is free from rancidity. An analysis of a sample of the mineral product gave the following results:

Total solids, 98.81%
Total nitrogen, 7.65%
Ash, 55.46%

Riboflavin, 9.7 micrograms per 1 gram of material
Niacin, 44.0 micrograms per 1 gram of material
Pantothenic acid, 7.4 micrograms per 1 gram of material
Kreis test for rancidity negative.

It will be seen that this material is entirely different from commercial bone meal that consists of unmodified ground bones and is, instead, a valuable mineral product.

The mineral and protein can be separated together without reducing the acidity of the acid digested fish waste by subjecting the entire acid digestion product to concentration and drying, or by first separating oil and only a part of the amino acid solution. In this case, a product is obtained which contains both the valuable protein material and the minerals, as well as part or all of the soluble nitrogen compounds. An analysis of a sample of such a product is given below:

Protein, 51.5%
Ash, 20.13%
Fat, 8.21%
Moisture, 10.63%
Fiber, 0.029%
Riboflavin, 8.2 micrograms per 1 gram of material
Niacin, 22.3 micrograms per 1 gram of material The oil obtained as a product of the present process is a valuable oil product. It has very little odor, is free from rancidity, has a low peroxide number and possesses good keeping qualities. The amount of acid used in the process is not sufficient to hydrolize the proteins or fats materially or to adversely influence the vitamins in the oil. The oil separated by the present process contains the fish tissue oil as well as the oil from the livers and entrails. This oil is separated in an acid condition and is stable and in storage does not turn rancid even if it contains an appreciable content of free fatty acids. The keeping quality of the vitamins in this oil have been noted in various samples. While the vitamin content is much lower than that recovered from fish livers or fish entrails, the oils recovered from red fish carcass waste may have a vitamin content of from 1000–2000 units of vitamin A per gram.

The amino acid product produced by the present process is a valuable solution of soluble nitrogen compounds and represents a considerable portion of the protein converted into amino acids, including argenin. It is also rich in water soluble vitamins. An analysis of an amino acid product so produced, after concentration, showed the following results:

Total nitrogen, 43.10 mg./cc.
Total solids (100° C. in drying oven), 36.42%
Amino nitrogen, 5.78 mg./cc.

Microbiological assays of the product showed the following results:

Riboflavin, 10 micrograms/cc.
Nicotinic acid, 47 micrograms/cc.
Pantothenic acid, 11 micrograms/cc.
Folic acid, 2.5 micrograms/cc. (S. lactis method)
Biotin, 0.065 micrograms/cc.

The acid solution of soluble nitrogen compounds is a dilute aqueous solution and is advantageously concentrated to form a concentrated solution or even to form a dry product. The concentration can be carried out by spray evaporation or in vacuum driers or stills. A product containing around 50% of solids and 50% of water is a suitable concentrated liquid product for marketing as a concentrated amino acid product. Where the product is evaporated to dryness, it can be marketed in powdered or solid form.

When the entire product resulting from the acid treatment is concentrated or dried without separating the proteins, minerals, oils and soluble nitrogen compounds, the entire product can be dried by spray evaporation or in vacuum driers either to a more concentrated liquid product or, better, to a dry solid product which can be ground to form a valuable fish meal product containing proteins in a predigested state, valuable minerals in a readily assimilable state, vitamins and soluble nitrogen compounds. The product may also contain the oils or the oils can be separated before concentration. An important advantage of this product is that its treatment is in an acid condition throughout and the product is a stable product.

Where the entire product of the acid treatment is thus concentrated, the mineral content will be in a somewhat different form from that of the mineral which is precipitated by partially reducing the acidity. Where the partial neutralization takes place before the separation of protein, the colloidal predigested protein and the readily assimilable minerals will be obtained as a composite product and the amino acid content of this product will be relatively low as compared with the product made when the entire product from the acid treatment is concentrated together.

While the process has been described in connection with its application to red fish carcass waste, it can also be applied to other fish waste such as other fish from which the fillets have been removed or even to whole fish such as manhaden, etc. The whole fish or the fish carcass waste when ground and treated with acid by the present process gives valuable products including proteins, minerals, oils, soluble nitrogen compounds, etc., and particularly products containing valuable vitamins and which have important advantages as food products. Instead of giving a relatively low grade fish meal such as is obtained by present rendering and cooking processes or ground undigested bone meal or fish oils of impaired vitamin content, the present process gives valuable protein, mineral, oil and amino acid products and products having improved stability and containing valuable vitamins. The mineral products produced by the present process are valuable mineral products for feeding purposes where high requirements for minerals exist, e. g., for feeding egg-producing hens.

As illustrating the value of the protein and mineral products for food purposes, feeding tests were conducted on chicks from day old to eight weeks with the combined protein and mineral product above described (containing 51.5% protein). Tests were carried out at the same time with an ordinary commercial fish meal. The results of these tests are given below. For the tests of group I a complete feed was used containing, among other things, 3% of an ordinary commercial fish meal. For the tests of group II the same feed was used except for the elimination of the 3% of fish meal and the incorporation of 3.8% of the product above referred to. The 3.8% was used in comparison to the 3% in order to keep the protein content of the two lots the same. The tests were carried out with chicks of the same sex to obtain comparative results which were as follows:

| Group | Sexed Wt. at 8 Wks. | Mortality | Feed Per Unit of Gain |
|---|---|---|---|
|   | Grams | Percent |   |
| I | 780 | 8 | 2.9 |
| II | 874 | 4 | 2.8 |

The results of these tests indicate that a better growth was obtained with the use of the improved product of the present invention than with the use of ordinary fish meal with a diet otherwise the same.

It will thus be seen that the present invention provides an improved process for treating fish waste containing fish bones and fish flesh with entrails, heads, etc., with resulting conversion of the fish waste into valuable products. It will also be seen that various products can be produced including protein, mineral, oil and amino acid products having valuable contents of vitamins and forming valuable food and vitamin containing products.

It will further be seen that the present invention involves an acid treatment of the fish waste with an amount of acid which converts the fish bones into a soluble form and which also converts the fish proteins into a fine suspension more or less colloidal in character and containing the proteins in a readily digestible form and in what might perhaps be considered a partially digested or predigested condition. The acid which is used is largely used up or neutralized by its reaction with the fish bone and with the fish protein to convert the bone into a soluble bone and the protein into a fine suspension.

It will further be seen that various products can be produced, including individual products, namely proteins, minerals, oils, and amino acids containing vitamins; and that valuable composite products can also be produced, including a composite protein mineral product separately recovered from the amino acid product and the oil; and that a valuable composite product can also be produced which contains the proteins, minerals, and part or all of the soluble nitrogen compounds either with the oils or from which the oils have been largely separated. These various products differ somewhat in character but they are all valuable food products and all of the fish waste is used up in making these valuable food products.

I claim:

1. The method of treating fish body material containing fish bones which comprises grinding such material and forming the ground material into an aqueous liquid mash capable of being stirred, admixing the ground material with a mineral acid, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, and separating from the homogenized mixture a product containing the acid-insoluble protein.

2. The method of treating fish body material containing fish bones which comprises grinding such fish material and forming the ground material into an aqueous liquid mash capable of being stirred, admixing the ground material with a mineral acid in amount sufficient to bring the pH to about 1.6, stirring the resulting mixture and continuing the acid treatment until the fish body pieces are broken up and the bones dissolved and an homogenized mixture is obtained, discontinuing the acid treatment before the fish protein is substantially hydrolyzed and while the homogenized mixture contains freed fish oils and the fish protein mainly in the form of acid-insoluble finely-divided protein in suspension in an aqueous acid solution of salts resulting from the dissolving of the bones and of soluble nitrogen compounds, and separating from the homogenized mixture a product containing the acid-insoluble protein.

3. The method of treating fish body material containing fish bones which comprises grinding such material and forming the ground material into an aqueous liquid mash capable of being stirred, admixing the ground material with hydrochloric acid, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, and separating from the homogenized mixture a product containing the acid-insoluble protein.

4. The method of treating fish body material containing fish bones which comprises grinding such material and forming the ground material into an aqueous liquid mash capable of being stirred, admixing the ground material with a mineral acid in sufficient amount to bring the pH to about 1.6, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, separating the suspended protein from the homogenized mixture, subsequently reducing the acidity of the remaining solution to at least about pH 5.2 to precipitate dissolved salts, and separating the precipitated salts from the remaining solution.

5. The method of treating fish body material containing fish bones which comprises grinding such material and forming the ground material into an aqueous liquid mash capable of being stirred, admixing the ground material with a mineral acid in sufficient amount to bring the pH to about 1.6, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, reducing the acidity while the insoluble proteins are still present to precipitate dissolved salts, and separating the insoluble protein and precipitated salts from the remaining solution.

6. The method of treating fish body material containing fish bones which comprises grinding such material and forming the ground material into an aqueous liquid mash capable of being stirred, admixing the ground material with a mineral acid, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, and removing water from the resulting product to give a composite food product containing the insoluble proteins, minerals, and soluble nitrogen compounds.

7. The method of treating fish body material containing fish bones and made up of the carcasses of fish from which fillets have been removed and which contain the fish bones, heads, flesh and entrails which comprises grinding such material and forming the ground material into an aqueous liquid mash capable of being stirred, admixing the ground material with a mineral acid, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly in the form of acid-insoluble finely divided protein in suspension in an aqueous acid solution of salts resulting from the dissolving of the bones and of soluble nitrogen compounds, and separating from the homogenized mixture a product therefrom containing the acid-insoluble protein.

8. The method of treating fish body material containing fish bones which comprises grinding such material and forming the ground material into an aqueous liquid mash capable of being stirred, admixing the ground material with a mineral acid in sufficient amount to bring the pH to about 1.6, stirring the resulting mixture and continuing the acid treatment until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, and subjecting the aqueous acid suspension to fractionation by separating the protein suspension and oil therefrom followed by reduction of acidity to precipitate dissolved minerals and the separation of the precipitated minerals and finally concentrating the solution of soluble nitrogen compounds.

9. The method of treating fish body material containing fish bones which comprises grinding such material and forming the ground material into an aqueous liquid mash capable of being stirred, admixing the ground material with a mineral acid, stirring the resulting mixture and heating the same to a temperature of about 100° C. for a short time until the fish body pieces are broken up and the bones dissolved and a homogenized mixture is obtained, discontinuing the acid treatment before the fish protein is substantially hydrolyzed and while the homogenized mixture contains freed fish oils and the fish protein mainly is in the form of acid-insoluble finely divided protein in suspension in an aqueous acid solution of salts resulting from the dissolving of the bones and of soluble nitrogen compounds, and separating from the homogenized mixture a product therefrom containing the acid-insoluble protein.

10. A fish protein and mineral product resulting from the limited acid treatment of fish body material including fish bones sufficient to dissolve the fish bones and convert the fish proteins mainly into the form of an acid-insoluble finely divided protein, said product being made up principally of fine particles of acid-modified fish proteins having an acid reaction and being insoluble in dilute acid solution, and a small but substantial amount of readily digestible acid solubilized fish bones intimately admixed therewith, and said product containing enzymes and vitamin B complex.

11. A fish protein and mineral product resulting from the limited acid treatment of fish body material including fish bones sufficient to dissolve the fish bones and convert the fish proteins mainly into the form of an acid-insoluble finely divided protein, said product being made up principally of readily digestible acid solubilized fish bones and fine particles of acid modified fish proteins having an acid reaction and being insoluble in dilute acid solution, and said product containing enzymes and vitamin B complex.

12. A fish protein and mineral product resulting from the limited acid treatment of fish body material including fish bones sufficient to dissolve the fish bones and convert the fish proteins mainly into the form of an acid-insoluble finely divided protein, said product being made up principally of readily digestible acid solubilized fish bones and acid soluble proteins intimately admixed therewith, and said product containing enzymes and vitamin B complex.

IVAN A. PARFENTJEV.

REFERENCES CITED

The following references are of record in the file of this patent:

UNITED STATES PATENTS

| Number | Name | Date |
| --- | --- | --- |
| 2,158,499 | Grassman | May 16, 1939 |
| 2,241,927 | Sahyun | May 13, 1941 |
| 2,406,249 | Parfentjev | Aug. 20, 1946 |

FOREIGN PATENTS

| Number | Country | Date |
| --- | --- | --- |
| 208,144 | Great Britain | Feb. 12, 1925 |
| 284,636 | Great Britain | July 5, 1928 |
| 378,399 | Great Britain | July 25, 1932 |

Certificate of Correction

Patent No. 2,512,375 — June 20, 1950

IVAN A. PARFENTJEV

It is hereby certified that error appears in the printed specification of the above numbered patent requiring correction as follows:

Column 4, line 70, for the word "extraction" read *extracted*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*